United States Patent [19]

Sato

[11] Patent Number: 4,770,364

[45] Date of Patent: Sep. 13, 1988

[54] FISHING REEL HAVING IMPROVED BRAKE LINING

[75] Inventor: Jun Sato, Sakai, Japan

[73] Assignee: Shimano Industrial Company Limited, Osaka, Japan

[21] Appl. No.: 139,158

[22] Filed: Feb. 21, 1987

Related U.S. Application Data

[60] Division of Ser. No. 913,587, Sep. 30, 1986, abandoned, which is a continuation of Ser. No. 733,599, Mar. 13, 1985, abandoned.

[30] Foreign Application Priority Data

May 18, 1984 [JP] Japan ............................. 59-73871[U]

[51] Int. Cl.$^4$ ............................................. A01K 89/02
[52] U.S. Cl. ........................... 242/84.5 R; 242/84.5 A
[58] Field of Search ...................... 242/84.5 A, 84.5 R

[56] References Cited

U.S. PATENT DOCUMENTS

| | | | |
|---|---|---|---|
| 3,576,686 | 4/1971 | Schmidle et al. | 428/264 |
| 3,625,753 | 12/1971 | O'Brien et al. | 428/264 |
| 4,137,357 | 1/1979 | Emmons | 428/245 |
| 4,138,303 | 2/1979 | Taylor | 428/245 |
| 4,255,483 | 3/1981 | Byrd et al. | 428/245 |
| 4,259,395 | 3/1981 | Yasui et al. | 428/245 |
| 4,259,397 | 3/1981 | Saito et al. | 428/902 |
| 4,286,012 | 8/1981 | Zins et al. | 428/252 |
| 4,331,729 | 5/1982 | Weber | 428/252 |
| 4,346,140 | 8/1982 | Carlson et al. | 428/252 |
| 4,349,595 | 9/1982 | Trainor et al. | 428/902 |
| 4,419,400 | 12/1983 | Hindersinn | 428/902 |
| 4,462,831 | 7/1984 | Raevsky et al. | 428/245 |

Primary Examiner—James J. Bell
Attorney, Agent, or Firm—Stevens, Davis, Miller & Mosher

[57] ABSTRACT

A brake lining for a fishing reel includes a metal or synthetic resin flexible, heat-resistant base layer and a woven fabric layer formed of heat resistant fibre and bonded onto at least one side of the base layer. The brake lining is applied to a friction member, such as a drag disc, forming part of a drag mechanism of the fishing reel so that the brake lining is brought into full-face contact rather than local contact with the friction member. The synthetic resin material of the base layer does not impregnate the woven fabric layer. As a result, none of the synthetic resin material is exposed on the outside surface of the woven fabric layer.

2 Claims, 1 Drawing Sheet

FISHING REEL HAVING IMPROVED BRAKE LINING

This application is a division of application Ser. No. 913,587, filed Sept. 30, 1986, which in turn is a continuation of application Ser. No. 733,599, filed Mar. 13, 1985, now abandoned.

FIELD OF THE INVENTION

This invention relates to a brake lining for a fishing reel, and more particularly, to a brake lining used for a drag mechanism at the fishing reel.

In detail, this invention relates to a brake lining interposed between a flange at a spool and a drag disc opposite to the flange, e.g., in a double bearing fishing reel, wherein the brake lining applies resistance against free rotation of the spool and transmits a driving force from a handle to the spool through the drag disc.

BACKGROUND OF THE INVENTION

Conventional brake linings used for the drag mechanism in a double bearing fishing reel are formed of a single raw material, such as asbestos or phenol resin and are shaped like a plate. Such brake linings are flexible as a whole, but are hard at their surfaces.

The brake lining is interposed between the flange of the spool and the drag disc opposite the flange and is brought into press-contact with the drag disc when the spool and drag disc axially move relative to each other, thereby applying resistance against free rotation of the spool, or driving the spool to slidably rotate with respect to a load thereon. The conventional brake lining, which is flexible as a whole, but hard at the surface thus having local rigidity as above-mentioned, will cause local press-contact with the friction member, such as the spool or the drag disc, when these members are inferior in dimensional accuracy. Such local press-contact may result in positional fluctuations during rotation of the above members.

Hence, the resistance applied against the free rotation of the spool is not uniform, thereby creating a problem in that (1) accurate resistance cannot be applied and (2) non symmetrical wear is caused by the local press-contact so as to reduce the friction area and the maximum dragging force with respect to a press-contact force.

SUMMARY OF THE INVENTION

An object of the invention is to provide a brake lining with improved comformability to the friction member, such as the drag disc, thereby enabling full-face contact, but not local contact, with the friction member.

This invention is characterized in that the brake lining has a flexible, heat resistant base and a woven heat resistant fabric which is, bonded to at least one side of the base so that the base and woven fabric are combined with each other.

The brake lining of the invention comprises the base and woven fabric bonded thereto and has the characteristics of being conformable to the friction member while maintaining desired rigidity, thereby easily enabling full-face contact with the friction member, such as the drag disc, to be achieved. Hence, the brake lining of the invention can always apply a constant resistance magnitude against rotation of the spool at any rotary position relative to the friction member and can easily provide the desired resistance value even when outside dimensions are reduced and a press-contact load on the friction member is reduced.

The base may be formed of a metal plate, but primarily of synthetic resin, such as phenol resin, or bakelite, having heat resistance to a temperature above 80° C. The woven fabric uses cotton or linen, of heat resistance to a temperature above 80° C. The fabric preferably has a short fibre. Also, heat resistant synthetic resin fibre may be used, or a composite material of synthetic and natural fibre may be used.

The woven fabric is bonded by an adhesive to the base. Also, when the base includes, for example, phenol resin, the woven fabric may be superposed on the phenol resin base in a state wherein the woven fabric is not yet cured, and then the base and woven fabric are baked under pressure, with the result that they become integrally bonded with each other.

The woven fabric is bonded to at least one side of the base, but may alternatively be bonded to both sides thereof. In a case where the woven fabric is bonded to only one side of the base, the other side thereof is fixed to the flange of the spool or the drag disc opposite to the flange.

According to the invention, the synthetic resin material of the base layer does not impregnate the woven fabric layer. Instead, the base layer material and woven fabric material form distinct layers. The woven fabric can be bonded to the phenol resin base via the synthetic resin of the base or via additional adhesive made of synthetic resin. As a result of the non-impregnation of the woven fabric layer by the synthetic resin material, none of the synthetic resin material is exposed on the outside surface of the woven fabric layer. This enables the full potential of the woven fabric to be effectively utilized so that resistance against rotation of the spool can be maintained constantly and uniformly at a desired magnitude.

These and other objects of the invention will become more apparent from the detailed description and examples which follow.

DETAILED DESCRIPTION OF THE INVENTION

Figure 1:
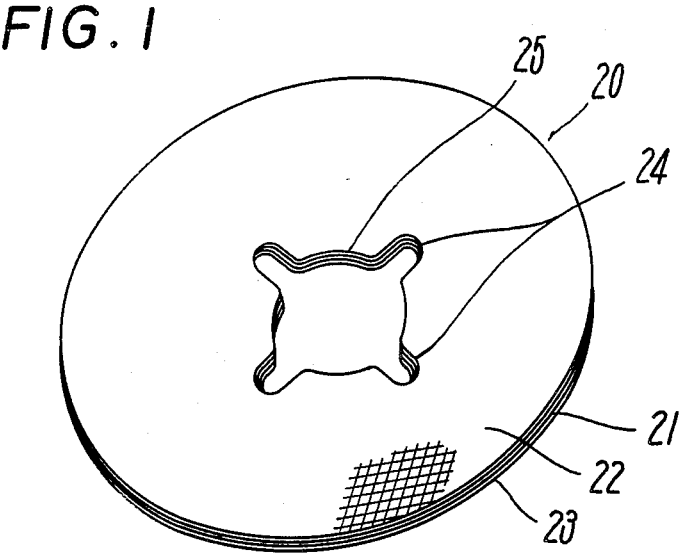
FIG. 1 is a perspective view of an embodiment of a brake lining of the invention.
Figure 2:
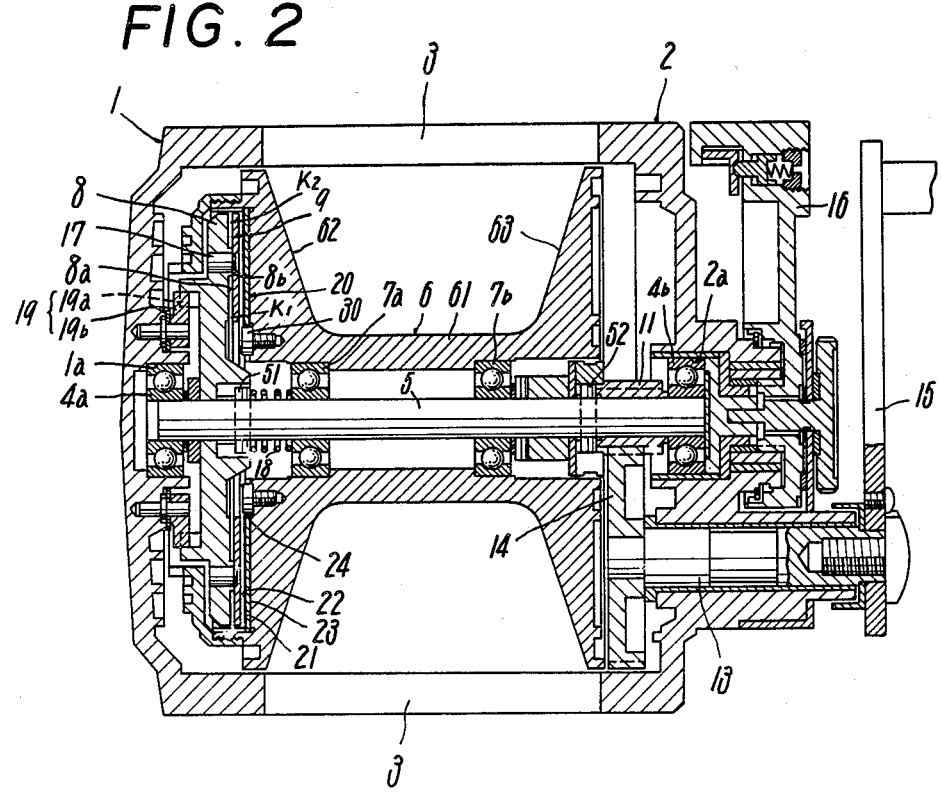
FIG. 2 is a sectional view illustrating the brake lining in FIG. 1, incorporated in a double bearing fishing reel.

A brake lining 20 as shown in FIG. 1 is incorporated in a drag mechanism in the double bearing fishing reel in FIG. 2. Before describing brake lining 20, in detail the fishing reel in FIG. 2 will be explained.

As shown in FIG. 2 first and second side frames 1 and 2 are positioned opposite to each other at a predetermined interval and are connected through a plurality of connecting rods 3 to form a reel body.

Also, the side frames 1 and 2 are provided with bearing bores 1a and 2a respectively and bearings 4a and 4b are held therein respectively so that a spool shaft 5 is supported through the bearings 4a and 4b to the side frames 1 and 2 to be rotatable and axially movable. At an intermediate portion of spool shaft 5, a spool 6 comprising a trunk 61 and a pair of first and second flanges 62 and 63 is supported rotatably through a pair of bearings 7a and 7b axially movable relative to the spool shaft 5. At one axial end of spool shaft 5 at a side of first side frame 1, a drag disc 8 opposite to the first flange 62 is supported stationarily but axially movably with respect to the spool shaft 5. Between the drag disc 8 and the first flange 62 are interposed an annular contact plate 9 held to the drag disc 8 and a brake lining 20 of the invention held to the first flange 62 of spool 6. Also, at the other axial end of spool shaft 5 at a side of second side frame 2, a pinion 11 is supported non-movably relative to the spool shaft 5. Also, handle shaft 13 is rotatably supported at second side frame 2, at one axial end of handle shaft 13 entering the inside of second side frame 2 is supported a master gear 14 engageable with the pinion 11, and to the other axial end of the same projecting outwardly from the second side frame 2 is fixed a handle 15.

The second side frame 2 rotatably supports a drag lever 16 for axially moving the spool shaft 5 so that the drag lever 16 is turned to move the spool shaft 5 toward the first side frame 1. This movement of spool shaft 5 is transmitted to the spool 6 through the bearing 4b, pinion 11 and bearing 7b, thereby moving the spool 6 together with the spool shaft 5 and bringing the lining 20 into press-contact with the contact plate 9. Hence, a dragging force caused by the press-contact is adapted to apply a predetermined resistance against free rotation of spool 6, and a driving force is transmitted to the spool 6 through the pinion 11, spool shaft 5, drag disc 8, contact plate 9 and lining 20.

Now, referring to FIG. 2, the drag disc 8 is provided with an annular holding surface 8a for holding the contact plate 9. Also at a radially intermediate portion of the holding surface 8a is provided a projecting surface 8b which projects toward the flange 62 with respect to the holding surface 8a. Contact plate 9 is supported to the projecting surface 8b through pins 17, and gaps $K_1$ and $K_2$ are formed between the contact plate 9 and the holding surface 8a.

Also, the drag disc 8 is supported to be movable relative to the first side frame 1 and a spring 18 is interposed between the drag disc 8 and the bearing 7a for the spool 6. Spring 18 biases the drag disc 8 and spool 6 to move away from each other.

The spool shaft 5 is formed of a straight shaft and has at an intermediate portion transmitting pins 51 and 52 with project radially outwardly of the spool shaft 5.

In addition, reference numeral 19 in FIG. 2 designates a sound generating mechanism comprising ratchet teeth 19a provided at the drag disc 8 and pawls 19b provided at the first side frame 1.

Next, explanation will be given on the brake lining of the invention in accordance with FIG. 1, which is applied to the double bearing fishing reel constructed as above-mentioned.

The brake lining 20 in FIG. 1 comprises a base 21. Base 21 is heat resistant and flexible. Brake lining 20 also includes woven fabrics 22 and 23 formed of heat-resistant fibre and bonded onto both side surfaces of base 21. Base 21 and woven fabrics 22 and 23 are superposed in three layers. Also, the brake lining 20 is disc-like shaped and has at its center a holding bore 25 including four radially disposed bores 24.

In greater detail, the base 21 in FIG. 1 employs phenol resin, is about 80 mm in an outer diameter and 0.2 mm in thickness, and is flexible as a whole, i.e., over its entire extent. The woven fabrics 22 and 23 bonded to both sides of base 21 employ cotton cloth, are formed as large as the base 21, and are superposed therein before being heat cured. Then, the base 21 and woven fabrics 22 and 23 are baked in order to become bonded with each other. In addition, the base 21 may employ synthetic resin other than phenol resin, or a thin metal plate, when it has heat resistance to a temperature above 80° C. and flexibility. Thus, the material for the base 21, so long as it has the necessary heat resistance and flexibility, is not particularly defined.

Alternatively, the woven fabrics 22 and 23 may use natural fibre, such as linen, synthetic resin fibre, or a mixture of natural fibre with synthetic fibre, so long as the resulting woven fibres have the requisite heat resistance to a temperature above 80° C.

When base 21 is formed of a thermosetting resin, it is preferable that the woven fabrics 22 and 23 are superposed on the base 21 in a state in which they are not yet cured, and are baked as above-mentioned. Alternatively, the base 21 and woven fabrics 22 and 23 may be bonded by use of an adhesive. In either case, the woven fabrics 22 and 23 are bonded to have their surfaces parallel to each other.

The synthetic resin material of the base layer does not impregnate the woven fabric layer. Accordingly, none of the synthetic resin material is exposed on the outside surface of the woven fabric layer, thus enabling effective utilization of the full potential of the woven fabric to apply resistance against rotation of the spool. Hence, the rotation resistance can be maintained constantly and uniformly at a desired magnitude.

The brake lining constructed as foregoing is incorporated in the drag mechanism at the double bearing fishing reel such that the lining 20 abuts against the end face of first flange 62 at the spool 6, and support bolts 30 are inserted through the radial bores 24 to screw with the first flange 62, so that the lining 20 is supported thereto such that is is not rotatable but is axially movable relative to first flange 62.

In the condition wherein spool 6 is freely rotatable as shown in FIG. 2, the drag lever 16 is turned to axially move the spool 6 toward the drag disc 8 against a spring force of spring 18 to thereby bring the lining 20 into press-contact with the contact plate 9 which is held against drag disc 8. Hence, the driving force is transmitted from the handle shaft 13 to the first flange 62 through the master gear 14, pinion 11, spool shaft 5, drag disc 8, contact plate 9 and lining 20, thereby rotating the spool 6.

The contact plate 9 is held only at a radially intermediate portion thereof to the projecting surface 8b which projects from the holding surface 8a of drag disc 8. Plate 9 is elastically displaceable at its radially outward and inward portions in the range of gaps $K_1$ and $K_2$ formed between said radially outward and inward portions and the holding surface 8a at the drag disc 8. As a result contact plate 9, even when held to the drag disc 8, does not become warped. Hence, when the press-contact force caused by movement of spool 6 is small and hence does not deflect drag disc 8, the contact plate 9 and lining 20 are brought into full-face contact with each other.

When the press-contact force caused by the axial movement of spool 6 increases corresponding to a pull of a hooked fish, the drag disc 8 deflects away from the first flange 62 and the contact plate 9 is slanted in the deflecting direction of drag disc 8 following the deflection thereof. Thus, when the contact plate 9 is slanted, surface pressure on the radially inward portion of contact plate 9 becomes larger than that on the radially outward portion thereof. As a result, the radially inward portion elastically shifts in the range of gap $K_1$ and the radially outward portion is subjected to a reaction to the press-contact force acting on the radially inward portion, thereby being brought into press-contact with the lining 20. On the other hand, when a winding force applied to wind up a fishing line onto the spool 6 is applied under a condition where the line has been subjected to a large tension from a hooked fish, this allows the radially outward portion at the first flange 62 to elastically shift axially outwardly thereof.

Since lining 20 has flexibility as a whole, i.e., over its entire extent, even when the urging surface of first flange 62 applied against lining 20 elastically shifts to form a curved surface, lining 20 deflects corresponding to the elastic shift of first flange 62, and comes into full-face contact with the contact plate 9. In other words, when the first flange 62 elastically shifts, the radially outward portion of contact plate 9 is urged axially outwardly through the lining 20 deflecting in a manner corresponding to the elastic shift of first flange 62, thereby elastically shifting in the range of gap $K_2$. Hence, the elastic restoring forces of the radially outward and inward portions bring the contact plate 9 into full-face contact with the lining 20, thereby enabling the lining 20 and contact plate 9 to incur reduced non-symmetrical wear thereon.

The lining 20 is adapted to be kept in full-face contact with the contact plate 9 in any rotating position relative thereto. As a result, the resistance value applied to the rotation of spool 6 is maintained to be uniform to thereby prevent vertical swinging of the tip of the rod.

Also, the lining 20, which always comes into fullface contact with the contact plate 9, can achieve a desired resistance value with ease even when the outside dimensions are small and also the press-contact force is small with respect to the contact plate 9. Hence, the lining 20 and contact plate 9 have a reduced frequency of use, thereby being lightweight and inexpensive. Also, they suffer less wear due to the small press-contact force, thereby maintaining the resistance value stable so as to require no adjusting work and also prolong their life spans.

Also, the woven fabrics 22 and 23, which are bonded onto both sides of base 21, can be turned over for use, thereby further prolonging their life spans.

Alternatively, the lining 20 may be attached to the contact plate 9, or may be applied to any member which provides resistance against rotation of the spool at the double bearing reel, single bearing reel or spining reel.

Also, the woven fabric may be bonded onto only one side surface of base 21.

As seen from the above, the lining of the invention comes always in full-face contact with the friction member, such as the contact plate, thereby enabling the resistance value applied against rotation of the spool to be kept constant. Also, when the driving force is transmitted from the handle to the spool, the lining is in full-face contact, but not local contact, with the contact plate, thereby avoiding non-symmetrical wear of the lining and preventing deterioration of the maximum dragging force.

While an embodiment of the invention has been shown and described, the invention is not limited to the specific construction thereof, which is merely exemplary in the specification rather than defined.

What is claimed is:

1. A fishing reel comprising:
    a reel body;
    a spool shaft mounted on said reel body;
    a spool mounted on said spool shaft to rotate relative to said reel body;
    a brake mechanism for applying a resistance against rotation of said spool, said brake mechanism comprising a friction member for contacting said spool and a brake lining for making full-face contact with said friction member, said brake lining comprising:
    (i) a flexible, heat-resistant base layer comprising a synthetic resin material, and
    (ii) at least one woven fabric layer attached onto at least one side of said base layer, said woven fabric layer comprising a heat-resistant fiber, said synthetic resin material not impregnating said woven fabric so that none of said synthetic resin material is exposed on an outside surface of said woven fabric layer, said woven fabric layer having heat-resistance to a temperature above 80° C.

2. A fishing reel according to claim 1, wherein the woven fabric comprises cotton fibers.

* * * * *